US012470102B2

(12) United States Patent
Schmitt et al.

(10) Patent No.: US 12,470,102 B2
(45) Date of Patent: Nov. 11, 2025

(54) ROTOR ASSEMBLY HAVING A CONTAINMENT RING FOR AN ELECTRIC MOTOR

(71) Applicant: Ford Global Technologies, LLC, Dearborn, MI (US)

(72) Inventors: Matthew Schmitt, Salt Lake City, UT (US); Devan James Anderson, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 18/490,093

(22) Filed: Oct. 19, 2023

(65) Prior Publication Data

US 2025/0132623 A1  Apr. 24, 2025

(51) Int. Cl.
| H02K 1/32 | (2006.01) |
| H02K 1/276 | (2022.01) |
| H02K 15/03 | (2006.01) |
| H02K 15/12 | (2006.01) |
| H02K 21/14 | (2006.01) |

(52) U.S. Cl.
CPC ............ *H02K 1/32* (2013.01); *H02K 1/276* (2013.01); *H02K 15/03* (2013.01); *H02K 15/12* (2013.01); *H02K 21/14* (2013.01)

(58) Field of Classification Search
CPC .......... H02K 1/276; H02K 1/32; H02K 15/03; H02K 15/12; H02K 21/14; H02K 9/19; H02K 9/197; H02K 2203/09
See application file for complete search history.

(56) References Cited

U.S. PATENT DOCUMENTS

| 10,177,631 | B1* | 1/2019 | Hopkins | H02K 5/15 |
| 11,031,834 | B2 | 6/2021 | Degner et al. | |
| 11,451,102 | B2 | 9/2022 | Kimoto et al. | |
| 2018/0262068 | A1* | 9/2018 | Koshino | H02K 1/16 |

FOREIGN PATENT DOCUMENTS

JP          2013181106 A  *  9/2013

OTHER PUBLICATIONS

JP-2013181106-A, all pages (Year: 2013).*

* cited by examiner

*Primary Examiner* — Naishadh N Desai
(74) *Attorney, Agent, or Firm* — David B. Kelley; Brooks Kushman, P.C.

(57) ABSTRACT

A rotor assembly for an electric motor includes a rotor core, a plurality of magnets, and a rotor core mold member. The rotor core defines a rotor bore and a plurality of cavities distributed about the rotor bore and extending through the rotor core. The plurality of magnets are disposed in the plurality of cavities. The rotor core mold member extends through the plurality of cavities to retain the plurality of magnets therein and, from the cavities, extends to a first end of the rotor core forming a containment ring at the first end. The containment ring forms a rim above a surface of the first end to restrict flow of a fluid to an outer side surface of the rotor core.

20 Claims, 3 Drawing Sheets

ROTOR ASSEMBLY HAVING A CONTAINMENT RING FOR AN ELECTRIC MOTOR

TECHNICAL FIELD

The present disclosure relates to a rotor assembly for an electric motor and more specifically, for an electric motor receiving cooling fluid.

BACKGROUND

Electric motors, such as those employed in electric vehicles, employ a rotor and stator to produce torque. In a non-limiting example, vehicular electric motors are powered by a traction battery to provide propulsion power to the vehicle. Such vehicular electric motors are typically a three-phase motor powered.

SUMMARY

In one form, the present disclosure is directed to a rotor assembly for an electric motor. The rotor assembly includes a rotor core, a plurality of magnets, and a rotor core mold member. the rotor core defines a rotor bore and a plurality of cavities distributed about the rotor bore and extending through the rotor core. The plurality of magnets are disposed in the plurality of cavities. The rotor core mold member extends through the plurality of cavities to retain the plurality of magnets therein and, from the cavities, extends to a first end of the rotor core forming a containment ring at the first end. The containment ring forms a rim above a surface of the first end to restrict flow of a fluid to an outer side surface of the rotor core.

In one form, the present disclosure is directed to a method that includes providing a rotor core defining a plurality of cavities distributed about a rotor bore and having a plurality of magnets disposed in the plurality of cavities; arranging a mold cap defining a groove at a first end of the rotor core; injecting a resin into the rotor having the plurality of magnets to have the resin coat the magnets within the cavities and protrude from the groove at the first end; and curing the resin forming a rotor core mold member having a containment ring formed at least partly by the groove to form a rotor assembly.

In one form, the present disclosure is directed to a rotor assembly for an electric motor. The rotor assembly includes a rotor core, a plurality of magnets, and a rotor core mold member. The rotor core defines a rotor bore, a plurality of cavities distributed about the rotor bore and extending through the rotor core, and a plurality of fluid passages extending from the rotor bore to a first end. The plurality of magnets are disposed in the plurality of cavities. The rotor core mold member extends through the plurality of cavities to retain the plurality of magnets therein and, from the cavities, extends to a first end of the rotor core forming a containment ring at the first end. The containment ring forms a rim above a surface of the first end, and surrounds outlets of the fluid passages at the first end of the rotor core to restrict flow of fluid from the outlets to an outer side surface of the rotor core.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
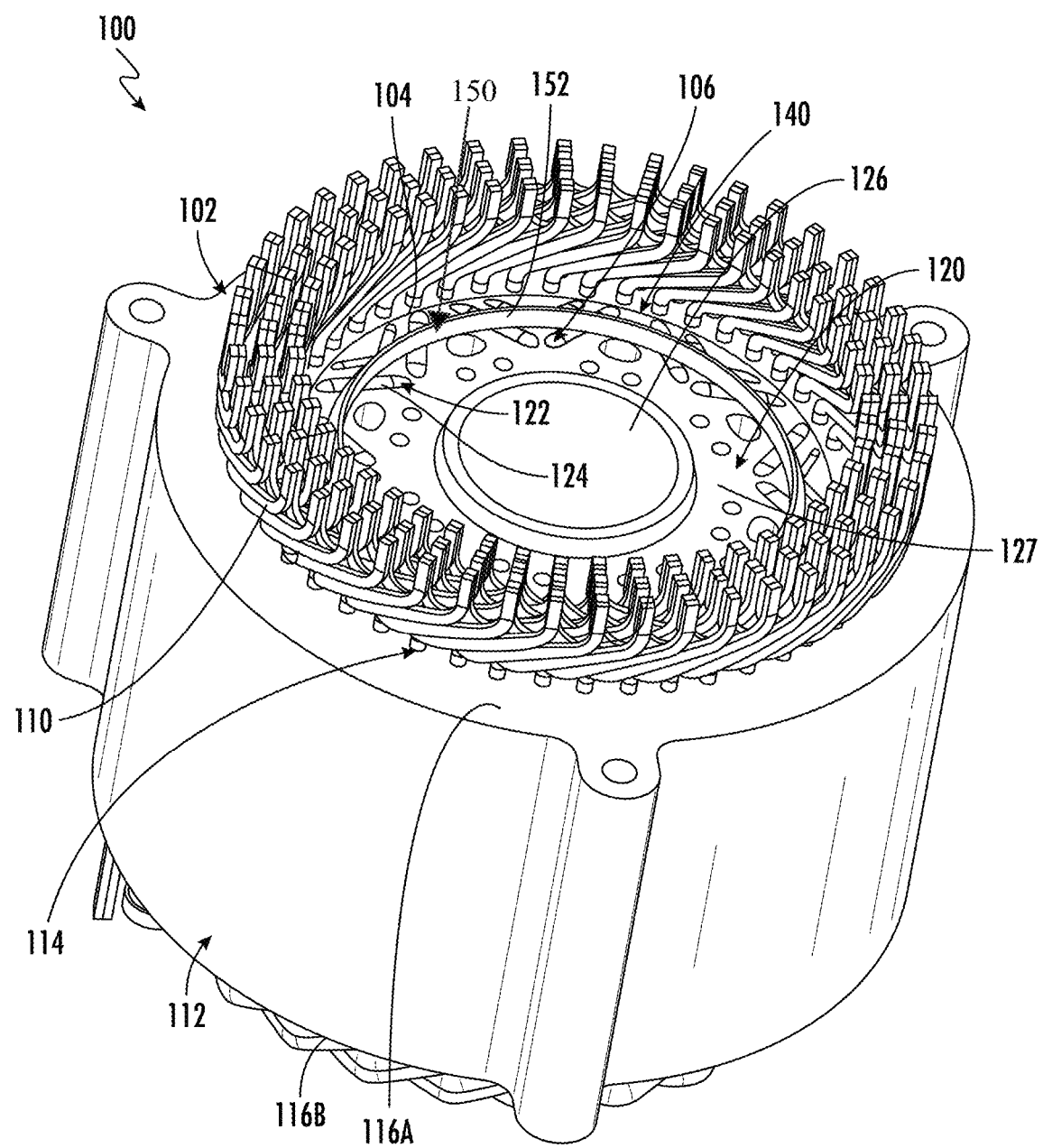
FIG. 1 is perspective view of an electric motor having a stator assembly and a rotor assembly in accordance with the teachings of the present disclosure.
Figure 2:
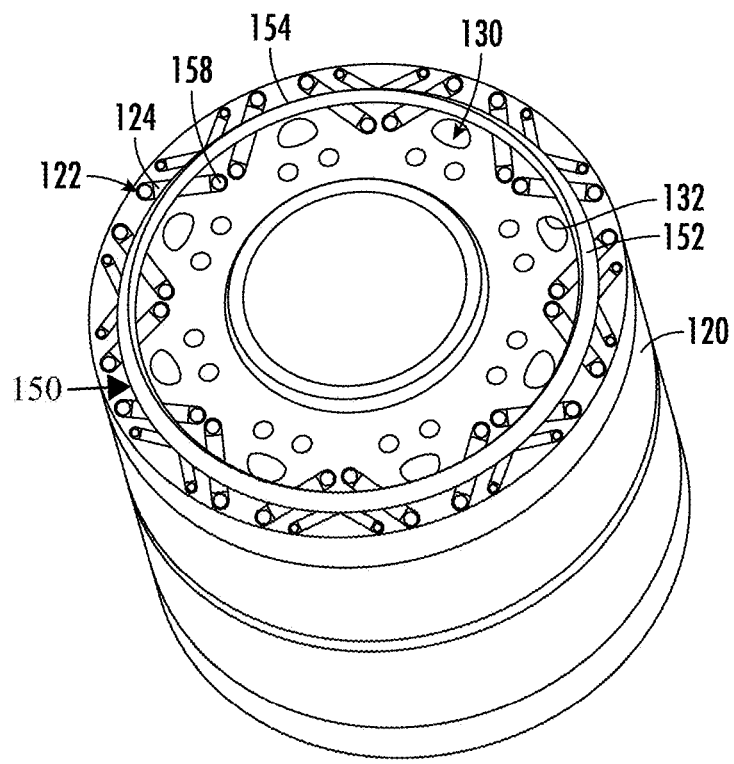
FIG. 2 is a perspective view of the rotor assembly of FIG. 1 in accordance with the teachings of the present disclosure.
Figure 3:
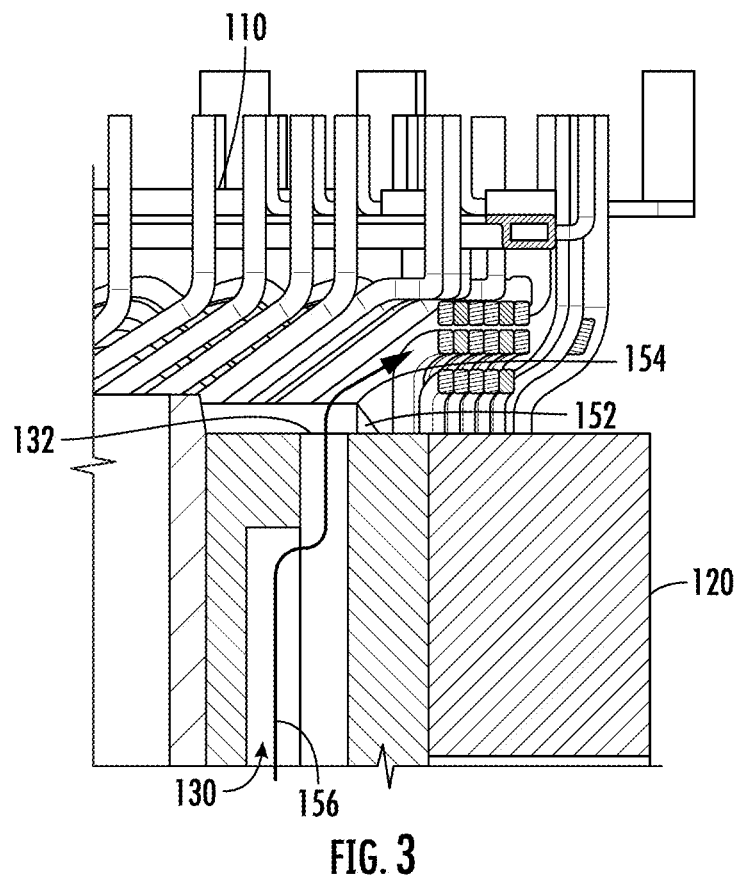
FIG. 3 is a partial cross-section view of the electric motor of FIG. 1 in accordance with the teachings of the present disclosure.

Referring to FIGS. 1-3, among other components, an electric motor 100 includes a stator assembly 102 defining a stator bore 104 and a rotor assembly 106 disposed in the stator bore 104. In one form, the stator assembly 102 includes a set of windings 110 and a stator core 112 that defines the stator bore 104 and a plurality of winding cavities 114. The set of windings 110 may be made of copper or other suitable material, and are disposed in the plurality of winding cavities 114. The ends of the set of windings extend past a first end 116A of the stator core 112, and in some applications, portions of the set of winding 110 extend past a second end 116B of the stator core 112.

In one form, the rotor assembly 106 includes a rotor core 120 defining a plurality of cavities 122 and a plurality of magnets 124 arranged in the plurality of cavities 122. The rotor core 120 further defines a rotor bore 126 for a rotor shaft (not shown) that is secured to and rotated by the rotor core 120. The rotor core 120 further defines a plurality of fluid passages 130 extending from the rotor bore 126 to at least one end 127 of the rotor core 120 defining outlets 132 at the end 127 of the rotor core 120.

During operation, electric current is applied to the windings 110 of the stator assembly 102 to generate an electromagnetic (EM) force that causes the rotor assembly 106 to rotate. Due to various design and operation factors, such as, but not limited to, presence of eddy current and amount of power being applied, heat is generated at the stator assembly 102 (e.g., the windings 110) and the rotor assembly 106 (e.g., magnets 124), thereby increasing the temperature of the electric motor 100.

In one form, to control the temperature of the electric motor 100, cooling fluid is provided and flows through the electric motor 100 to extract the heat from the rotor assembly 106 and the stator assembly 102. In a non-limiting example, the cooling fluid is fed through a center of the rotor shaft from an external source (e.g., a transmission system of the vehicle) and flows through the rotor shaft and then radially outward to the fluid passages 130 of the rotor core 120. The passages 130 are formed close to the magnets 124 to have the cooling fluid absorb heat from the magnets 124, which are the predominant heat generator in the rotor assembly 106.

From the rotor fluid passages 130, the cooling fluid is to be provided to the windings 110 of the stator assembly 102 to cool the stator assembly 102. The cooling fluid is to be directed to the windings 110 without spilling into a gap 140 between the rotor assembly 106 and the stator assembly 102. That is, to inhibit or reduce drag loss, electric motor 100 may include added components to inhibit the flow of the cooling fluid from the outlets 132 to the gap 140.

For example, separate endplates are typically provided at ends of the rotor assembly 106 to create an offset required to prevent the cooling fluid from entering the gap 140. In lieu of additional components and manufacturing steps, the rotor assembly 106 of the present disclosure includes a rotor core mold member 150 that is an integrated component having a containment ring 152 to restrict the flow of the cooling fluid.

In one form, the containment ring 152 protrudes from the end 127 of the rotor core 120 and has a rim 154 extending above the end 127 of the rotor core 120 to direct the cooling fluid away from an outer side surface of the rotor assembly 106 or more specifically, from the gap 140. In addition, the containment ring 152 surrounds the outlets 132 of the fluid passages 130 to retain and block the cooling fluid leaving the fluid passages 130 from radially flowing to the gap 140. More particularly, due to the centrifugal force generated by the rotor assembly 106, the cooling fluid flows radially outward. The containment ring 152 blocks the cooling fluid from radially flowing along the end 127 of the rotor core 120 towards the gap 140 and directs the cooling fluid away from the end 127 and the gap 140 to flow radially outwards onto the ends of the windings 110 of the stator assembly 102. An example flow path 156 of the cooling fluid is provided in FIG. 3. The cooling fluid further absorbs heat from the windings 110 of the stator assembly 102 to cool the stator assembly 102 before being routed to the external source, where the cooling fluid, which is now heated, is cooled using known techniques.

Figure 4:
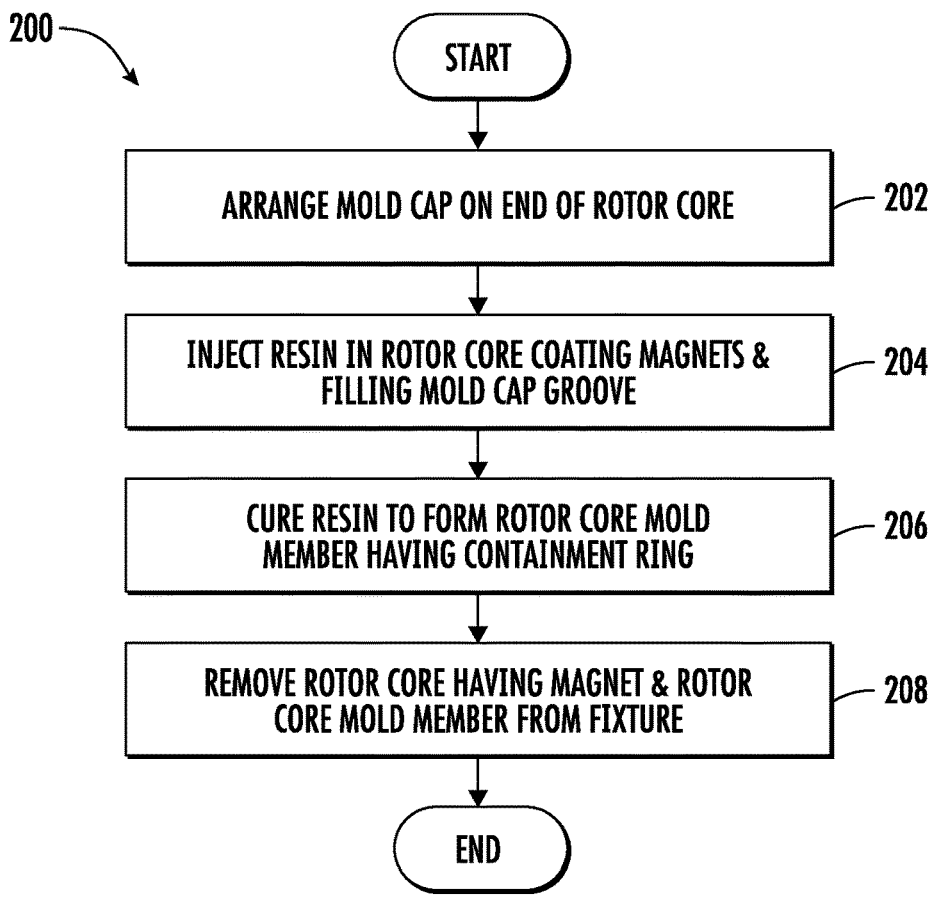
FIG. 4 is an example molding routine to form a rotor core mold member.

In one form, the rotor core mold member 150 is formed during a mold process of the rotor assembly 106 in which the rotor core 120 having the magnets 124 arranged in the cavities 122 is injected with a liquid resin to secure the magnets 124 in the cavities 122. More particularly, referring to FIG. 4, an example molding routine 200 to form the rotor core mold member 150 is provided. At 202, a mold cap is arranged at the end 127 of the rotor core 120. The rotor core, magnets 124 and mold cap may collectively be referred to as a core assembly.

Figure 5:
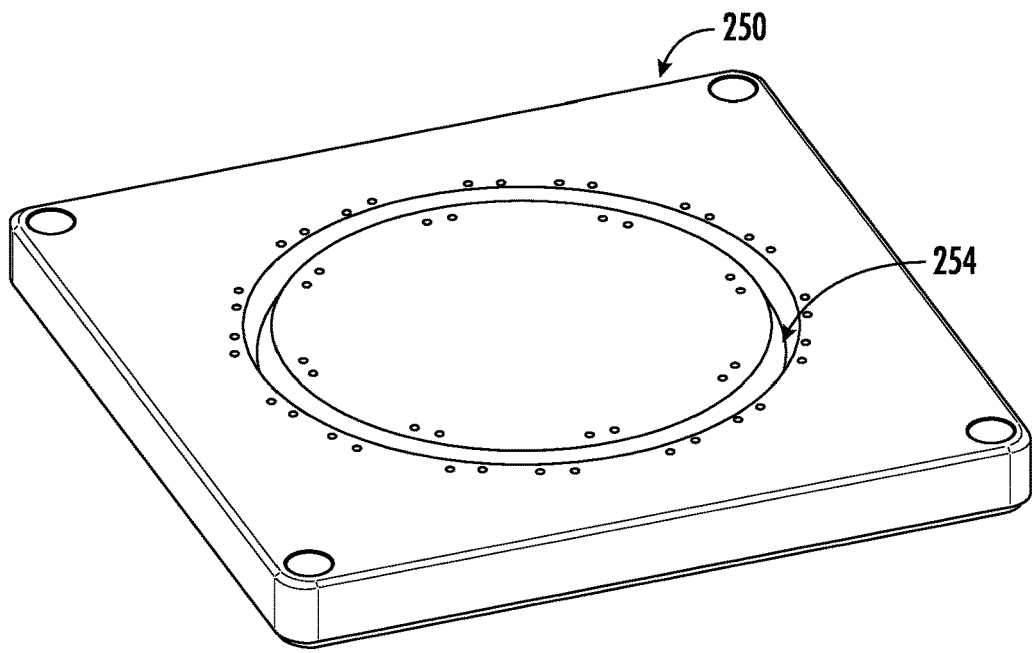
FIG. 5 is a perspective view of a mold cap employed during a molding process in accordance with the teachings of the present disclosure.

Referring to FIG. 5, an example of a mold cap 250 is provided, and is adapted to substantially cover the end 127 of the rotor core 120. The mold cap 250 defines a groove 254 that is adapted to align with multiple cavities 122 having the magnets 124 and at least one void (FIG. 2) defined between a magnet 124 and a cavity 122. The groove 254 is also adapted to surround the outlets 132 of the fluid passages 130. The profile and/or dimensions of the groove 254 is designed to provide the desired profile and dimension of the containment ring 152 (i.e., the containment ring 152 is formed by the groove 254 of the mold cap 250).

In some processes, the core assembly is secured in a fixture to provide an axial compressive force on the core assembly. Using known techniques, at 202, resin is injected into the rotor core 120 and specifically, the cavities 122 having the magnets 124 to have the resin coat the magnets 124 within the cavities and then flow to the end 127 of the rotor core 120 to protrude from the groove 254. Using, at least the mold cap 250, the resin is inhibited from entering the fluid passages 130. At 206, the resin is cured forming the rotor core mold member 150 with the containment ring 152 and once cooled, the rotor core 120 having the magnets 124 and the rotor core mold member 150 is removed from the fixture, at 208. To form the electric motor 100, the rotor assembly 106 is positioned in the stator bore 104 of the stator assembly 102 such that the set of windings 110 extend from the end 116A of stator assembly 102 that aligns with the end 127 of the rotor core 120 having the containment ring 152.

With continuing reference to FIGS. 1 to 3, as part of the rotor core mold member 150, the containment ring 152 is adapted to contact at least two or more cavities 122 from among the plurality of cavities 122 and in some variations, all of the cavities 122 to enhance contact and support of the containment ring 152 to the rotor core 120. In addition, the containment ring 152 is adapted to extend over at least one molded-void 158 (FIG. 2) defined between a magnet 124 and a cavity 122 housing the magnet 124. Specifically, portions of the rotor core mold member 250 include cured resin provided in voids between the magnets 124 and the cavities 122. For ease of illustration, the molded-void(s) 158 is provided as a circle arranged between the magnet 124 and the cavity 122. However, it should be readily understood that the shape of the molded void 158 is determined based on, at least, the space between the magnet 124 and the cavity 122, and thus the form of the molded-void(s) 158 varies and should not be limited to the figures. In some variations, the containment ring 152 is connected to the cured resin film, which is further connected to the cured resin in the cavities 122 to secure the containment ring 152 at the end 127 of the rotor core 120.

In some variations, if the rotor assembly 106 has a non-uniform configuration in a transverse direction, the rotor core mold member 150 may include an outer shell formed along an outer diameter of the rotor core 120, which may connect portions of the rotor core mold member 150 including the containment ring 152 together and permit simultaneous molding.

In some variations, the rotor core mold member 150 may be provided as a single connected piece of molding compound having at least the containment ring 152 and molded-void(s) 158 around the magnets 124 in the cavities.

In the example illustrated, the containment ring 152 has a circular shape and triangle shaped cross-section. While the containment ring is illustrated as a circular ring having uniform height with a triangular shaped cross-section, the containment ring 152 may be configured in various suitable ways, such as but not limited to, different shape, uniform/varying height, uniform/varying thickness, different cross-section, by, for example, adjusting physical characteristics of the groove of the mold cap (e.g., adjusting shape, dimensions).

While the containment ring 152 is illustrated at one end of the rotor assembly 106, the rotor core mold member 150 may form a second containment ring at a second end of the rotor core 120 opposite to the end 127 of the rotor core 120. Accordingly, during the molding process, a second mold cap may be provided at the second end of the rotor core 120 prior to the injection of the resin to form the second containment ring.

With the containment ring, additional distinct components, such as end plates, may be removed for controlling the flow of the coolant fluid. This may reduce the manufacturing process of the rotor assembly, and the complexity and weight of the electric motor while still providing fluid flow control at the end of the rotor core.

Using the rotor core mold member having the containment ring, the rotor assembly may also permit internal rotor cooling in the rotor assembly architecture which may be usually not be achievable due to known issues related to balancing the rotor assembly. That is, a rotor assembly may need to be balanced by inserting pins into discrete locations at the ends of the rotor core, which may require an exposed end (i.e., no end plates and thus, no internal rotor cooling). With the rotor cored molded member of the present disclosure, the end of the rotor core can remain exposed to receive balancing pins while strategically directing the cooling fluid away from the gap and onto the stator end windings using the containment ring.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A rotor assembly for an electric motor, comprising:
   a rotor core defining a rotor bore and a plurality of cavities distributed about the rotor bore and extending through the rotor core;
   a plurality of magnets disposed in the plurality of cavities; and
   a rotor core mold member extending through the plurality of cavities to retain the plurality of magnets therein and, from the cavities, extending to a first end of the rotor core forming a containment ring at the first end, wherein the containment ring forms a rim above a surface of the first end to restrict flow of a fluid to an outer side surface of the rotor core.

2. The rotor assembly of claim 1, wherein:
   the rotor core defines a plurality of fluid passages extending from the rotor bore to the first end, wherein the fluid is flowable from the rotor bore through the fluid passages and to the first end, and
   the containment ring surrounds outlets of the fluid passages at the first end.

3. The rotor assembly of claim 1, wherein the rotor core has a second end opposite of the first end, and the rotor core mold member extends to the second end and includes a second containment ring at the second end.

4. The rotor assembly of claim 1, wherein the containment ring has varying height and thickness.

5. The rotor assembly of claim 1, wherein the containment ring is uniform in height and thickness.

6. The rotor assembly of claim 1, wherein the rotor core mold member is defined by a resin material that is hardened during a curing process.

7. The rotor assembly of claim 1, wherein the rotor core mold member is adapted to directly contact each cavity of the plurality of cavities.

8. An electric motor comprising:
   a stator assembly defining a stator bore; and
   the rotor assembly of claim 1, disposed in the stator bore of the stator assembly.

9. The electric motor of claim 8, wherein:
   the stator assembly includes a set of windings that extend from at least one end of the stator assembly, and
   the fluid is flowable from the first end of the rotor core to ends of the set of windings extending from the at least one end of the stator assembly.

10. A method, comprising:
    providing a rotor core defining a plurality of cavities distributed about a rotor bore and having a plurality of magnets disposed in the plurality of cavities;
    arranging a mold cap defining a groove at a first end of the rotor core;
    injecting a resin into the rotor having the plurality of magnets to have the resin coat the magnets within the cavities and protrude from the groove at the first end; and
    curing the resin forming a rotor core mold member having a containment ring formed at least partly by the groove to form a rotor assembly.

11. The method of claim 10, further comprising positioning the rotor assembly in a stator bore of a stator assembly having a set of windings that extend from at least one end of the stator assembly that aligns with the first end of the rotor core.

12. The method of claim 10, further comprising arranging a second mold cap defining a groove at a second end of the rotor core, wherein the rotor core mold member has a second containment ring formed at least partly by the groove of the second mold cap.

13. The method of claim 10, wherein:
    the rotor core defines a plurality of fluid passages extending from the rotor bore to the first end,
    the mold cap is adapted to cover outlets of the fluid passages at the first end such that the groove is defined around the outlets, and
    injecting the resin further comprises providing axial compressive force to the mold cap and the rotor core, wherein the containment ring surrounds the outlets of the fluid passages at the first end.

14. A rotor assembly for an electric motor, comprising:
    a rotor core defining:
      a rotor bore,
      a plurality of cavities distributed about the rotor bore and extending through the rotor core, and
      a plurality of fluid passages extending from the rotor bore to a first end, and
    a plurality of magnets disposed in the plurality of cavities; and
    a rotor core mold member extending through the plurality of cavities to retain the plurality of magnets therein and, from the cavities, extending to a first end of the rotor core forming a containment ring at the first end, wherein:
    the containment ring forms a rim above a surface of the first end, and
    the containment ring surrounds outlets of the fluid passages at the first end of the rotor core to restrict flow of fluid from the outlets to an outer side surface of the rotor core.

15. The rotor assembly of claim 14, wherein the rotor core has a second end opposite of the first end, and the rotor core mold member extends to the second end and includes a second containment ring at the second end.

16. The rotor assembly of claim 14, wherein the rotor core mold member is defined by a resin material that is hardened during a curing process.

17. The rotor assembly of claim 14, wherein the rotor core mold member is adapted to directly contact each cavity of the plurality of cavities.

18. The rotor assembly of claim 14, wherein the containment ring is connected to portions of the rotor core mold member provided in at least two cavities from among the plurality of cavities.

19. An electric motor comprising:
a stator assembly defining a stator bore; and
the rotor assembly of claim 14, disposed in the stator bore of the stator assembly.

20. The electric motor of claim 19, wherein:
the stator assembly includes a set of windings that extend from at least one end of the stator assembly, and
the fluid is flowable from the first end of the rotor core to ends of the set of windings extending from the at least one end of the stator assembly.

* * * * *